United States Patent [19]
Toepfer et al.

[11] Patent Number: 5,470,134
[45] Date of Patent: Nov. 28, 1995

[54] METHOD OF DETERMINING A WEAR-DEPENDENT BRAKING FORCE DISTRIBUTION

[75] Inventors: Bernhard Toepfer, Stuttgart; Michael Reiner, Fellbach; Bodo Klein, Borsinghausen, all of Germany

[73] Assignee: Mercedes-Benz AG, Germany

[21] Appl. No.: 286,231

[22] Filed: Aug. 5, 1994

[30] Foreign Application Priority Data

Aug. 5, 1993 [DE] Germany ............ 43 26 256.2

[51] Int. Cl.⁶ .................................................. B60T 13/66
[52] U.S. Cl. .............. 303/9.61; 188/1.11; 188/71.1; 303/6.01; 303/9.69; 303/174
[58] Field of Search ............... 303/9.61, 91, 112, 303/100, 111, 6.01, 9.62, 9.69, 99, 20, 97, 22.1, 22.8; 188/1.11, 71.1, 196 R, 181 T, 195, 349; 364/426.01, 424.05, 426.02

[56] References Cited

U.S. PATENT DOCUMENTS

| | | | |
|---|---|---|---|
| 5,088,042 | 2/1992 | Brearley et al. | 364/426.01 |
| 5,172,960 | 12/1992 | Chareire | 303/9.61 |
| 5,312,168 | 5/1994 | Breen | 303/9.61 |
| 5,344,222 | 9/1994 | Helldorfer et al. | 303/91 |

FOREIGN PATENT DOCUMENTS

| | | |
|---|---|---|
| 0386952A3 | 9/1990 | European Pat. Off. . |
| 0546488A2 | 6/1993 | European Pat. Off. . |
| 3313078 | 10/1984 | Germany . |
| 3313078A1 | 10/1984 | Germany . |
| 3407716 | 9/1985 | Germany . |
| 3502051 | 7/1986 | Germany . |
| 3829951 | 3/1990 | Germany . |
| 4007360 | 9/1991 | Germany . |
| 2202016A | 9/1988 | United Kingdom . |
| 2266567A | 11/1993 | United Kingdom . |

*Primary Examiner*—Douglas C. Butler
*Attorney, Agent, or Firm*—Evenson, McKeown, Edwards & Lenahan

[57] ABSTRACT

A method of wear-dependent braking force distribution prevents adhesion problems without being limited to lowest brake pressures as is the case with conventional methods. Wear control is dispensed with only in the case of operationally very rare braking actions, for example, those above 0.3 g or a learned adhesion threshold. These rare braking actions are limited, in practice, to genuinely critical braking situations. Otherwise, the control interventions are carried out with to produce balanced wear only in the long term; an attempt is made to achieve wear at the same rate rather than simply balanced wear.

17 Claims, 2 Drawing Sheets

METHOD OF DETERMINING A WEAR-DEPENDENT BRAKING FORCE DISTRIBUTION

BACKGROUND AND SUMMARY OF THE INVENTION

The present invention relates to a method of determining and providing a wear-dependent braking force distribution.

A method for balancing out differences in brake lining wear is described in DE 33 13 078 C2. However the brake linings of the wheel brakes of motor vehicles do not, as a general rule, wear equally rapidly on all the axles or, indeed, on all the wheels as would obviously be desirable for the purpose of maintenance/repair cost optimization. Influencing factors which can cause unbalanced wear are, for example, scatter in the output force of the brake cylinders, in the wheel brake hysteresis, in the effective brake pressure, in the efficiency of the brake application, in the brake characteristics and in the specific wear coefficient.

Methods are known for balancing out differences in brake lining wear between the wheels or axles of motor vehicles braked by pressure medium based either on directly measured wear or residual lining thickness as described in German Patent 33 13 078 or indirectly by way of parameters which determine wear, such as the brake temperature, as described in German Offenlegungsschrift 35 02 051. These methods reduce the brake pressure on the more strongly worn brakes or the brakes with higher thermal loads. Indirect methods, such as the control of the brake pressures with the objective of balanced brake temperatures, have the disadvantage that wear at the same rate cannot be ensured because of the unavoidable scatter in the influencing factors, even if all the brake drums invariably reach the same temperature.

For safety reasons, all known methods of the type mentioned above must be limited to the lowest pressure range, i.e. less than 1 bar, if the use of the frictional adhesion between the tires and the road is not immediately monitored to avoid the danger of locking of the relatively more strongly braked wheels. Although locking is avoided in the case of vehicles with an anti-lock brake system (ABS), however, it still remains undesirable, for reasons of comfort, for the wheel-lock protection, which is intrinsically only intended for limiting cases, to be frequently employed in routine braking simply because of an unsuitable braking force distribution. In the case of the lightly loaded rear axles of empty lorries, on one hand, this would already occur on a wet roadway if pressures are selected for the frequent deceleration levels of 0.1 to 0.25 g largely responsible for wear, where g represents the gravitational acceleration value. On the other hand, a wear control system which only applied in the pressure range below 1 bar would not be functionally reliable because it could only deal with a fraction of the frequent braking actions.

The known solutions also leave the question open as to whether the control objective of "balanced wear" is, where possible, to be achieved in the short term with strong control interventions. Apart from the possible adhesion problems mentioned above, the attainment of this objective would lead to alternate overloading of the respectively less worn brakes and, in consequence, to overall wear which, though balanced, would be premature. Furthermore, the manner in which the magnitude of the brake pressure change necessary is itself to be determined and possibly limited has not been made known.

It is an object of the present invention to prevent adhesion problems without having to be limited to the lowest brake pressures. Wear control is dispensed with only in the case of operationally very rare braking actions above, for example, 0.3*g or a learned adhesion threshold which is limited, in practice, to very critical braking situations. Otherwise, the control interventions are carried out, in accordance with the present invention, with the objective of producing balanced wear only in the long term.

It is yet another object of the present invention to produce wear at the same rate and not just balanced wear.

In the case of electronically controlled brake systems, such as the so-called electro-pneumatic or electro-hydraulic brake systems, it is possible to specify computationally determined pressures deliberately and thereby, to set arbitrary braking force distributions. The computational and storage capability of such known vehicle electronics is used in the present invention. A particularly advantageous embodiment is provided by combination with the optimum adhesion method described in DE 40 07 360 A1.

The present invention is, however, generally suitable for all other methods of determining the basic braking force distribution provided, as in the case with known methods, the wheel rotational speeds are recorded for processing in the anti-lock protection devices.

The method of the present invention is based on the recognition that monitoring of the frictional connection or adhesion below the wheel-lock limit can occur by a simple rotational speed comparison. Determination of the absolute level of the adhesion coefficients or of the slip of the wheels is not necessary for this purpose, and the wheel rotational speeds obtained, for example, by known anti-lock brake system sensors, are sufficient. In this connection, reference is made to the method described in DE 38 29 951 A1. For obtaining balanced wear, a limiting value of the wheel rotational speeds, with reference to the vehicle speed, of, e.g., between 1 and 5%, is usable as a measure of a permissible deviation from that brake pressure distribution which is optimum with respect to the tire/road adhesion. The pressure differences to be selected, which are superimposed if necessary on a basic braking force distribution optimized with respect to adhesion, are limited to a relatively small amount for reasons of comfort. Their magnitude is not changed during a journey, with the exception of conditions critical to adhesion.

In a presently contemplated preferred mode, changes to the wear sensor signals during a journey are ignored. A wear condition is determined at the beginning of each journey and is "frozen". The wear condition is checked, if need be, after a certain number of braking actions for the purpose of excluding measurement errors. Because unbalanced wear can only be recognized after hundreds or even thousands of braking actions even in the case of very fine-resolution sensors, this "freezing" by determining the wear condition essentially only at the beginning of a journey is possible without risk and is also necessary to avoid continually fluctuating control interventions.

According to the present invention, the magnitude of the pressure difference selected is so small that the unbalanced wear only disappears quite slowly over many braking actions. The method of the present invention is, therefore, not a closed-loop control in the usual sense, i.e. no intervention to control wear is provided for the individual braking actions. Because of the high inertia of the system, long-term memories can be appropriate if the electronics are to be provided with a learning character or if measurement scatter in the wear sensing is to be balanced out over several journeys.

Assuming that the wear sensors are sufficiently insensitive to environmental effects (this applies particularly to their dependence on the temperature measurement), the wear values can also be permanently recorded and levelled up in accordance with the method procedure described below. The wear can also be balanced between wheels in a manner analogous to the wear optimization between axles. Independent of the driving condition currently present, equality of pressure between the wheel brakes on one axle is, for this purpose, set as providing optimum adhesion and, on this basis, small pressure differences are fed in when corresponding wear signals are present. The pressure differences possible at the front axle have to be limited because the brake pressure changes necessary for balanced wear can lead to the vehicle pulling to one side.

In addition, the present invention makes it possible to set particular wear ratios as is desirable, for example, in the case of vehicles with a lining volume distribution which departs greatly from the axial load distribution. By way of example, a wear ratio of 2:1 instead of 1:1 can be introduced in a vehicle with disc brakes on one axle and drum brakes on the other so that the drum brakes only have to be relined when, and only precisely when, the disc brakes have worn out two sets of linings.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
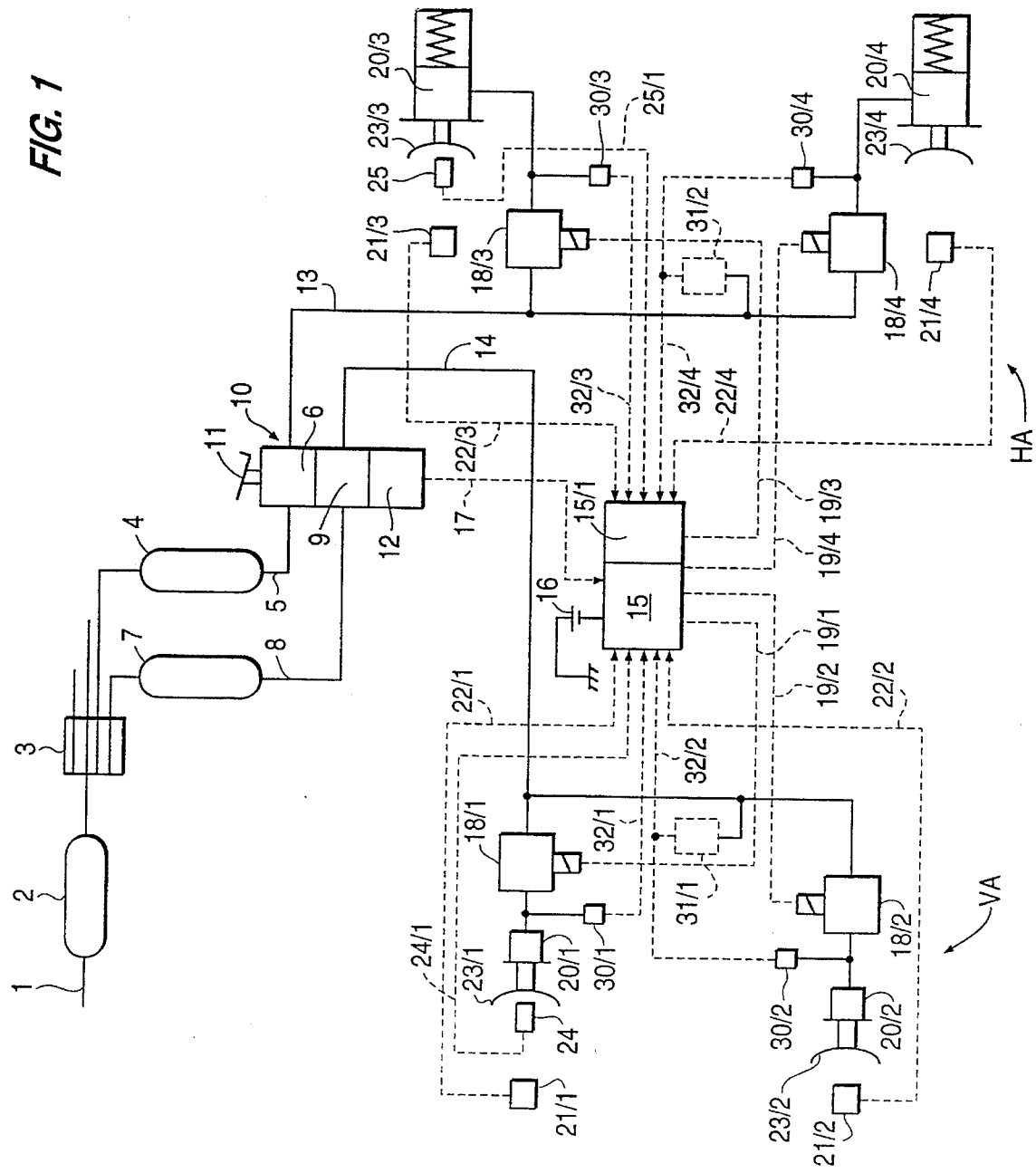
FIG. 1 is a schematic view of the suspensionside components of a typical compressed air brake system suitable for carrying out the method of the present invention.

For a better understanding of the method of the present invention, a description of a brake system suitable for carrying out that method will first be described by reference to FIG. 1. One such brake system includes components as are already known from high-quality electronic anti-lock brake systems (ABS) with central control and anti-lock brake system valves near the wheels. By way of wheel rotational motion sensors, brake systems of this type are provided to prevent, via wheel brake pressures controlled as a function of wheel rotational speeds, the locking of individual wheels when the frictional connection or adhesion limit determined by the tire/road friction pair is reached. This is done by reducing the brake pressure at the corresponding wheel, or at least not increasing it further, during the existence of a tendency to lock.

A reservoir 2 is supplied with pressure medium by a feed conduit 1 coming from a known air compressor (not shown). This pressure medium communicates with subsidiary reservoirs 4, 7 of a plurality of brake circuits via a multi-path safety valve 3. The illustrated reservoirs are, for example, associated with a respective front axle brake circuit and a rear axle brake circuit. Pressure medium flows via supply conduits 5, 8 to two individual sections 6, 9 of the operating brake valve 10 which is actuated by the pedal 11. An electrical pressure transducer, or a position or location pick-up, 12 is associated with the valve 10 or pedal 11. The transducer or pick-up 12 is positionally connected to the pedal 11 or the valve drive actuated thereby and is used for recognizing the driver's intention, $Z_{required}$, which is supplied via the signal line 17 to an electronic central control unit 15. The sections 6, 9 of the operating brake valve 10 supply pressure medium, via outlet-end operating pressure conduits 13 and 14, to electrically activated valves 18/1, 18/2 and 18/3, 18/4 respectively installed close to two different axles.

The valves 18/1 to 18/4 can be configured in a manner analogous to anti-lock brake system valves, such as are already used in conventional compressed-air operating brake systems with a superimposed electronic anti-lock brake system. These valves can, however, be of a more robust construction to achieve an increased life, because they have to act over a control range which is wider than the relatively narrow wheel-lock limit range. To this extent, the valves 18/1 to 18/4 are subjected to a control utilization which is higher than that of valves used for pure anti-lock brake control. Electrically activated pressure modulators of a known type (not shown) are, in particular, also usable at this location.

The valves 18/1, 18/2 and 18/3, 18/4 are respectively associated with brake cylinders 20/1, 20/2 and 20/3, 20/4 of, for example, a front axle and a rear axle of the vehicle. The valves are electrically activated by the electronic central control unit 15 via corresponding control lines 19/1 to 19/4. The wheel rotational speed sensors 21/1 to 21/4 continuously pick up the rotational speeds of the wheels and emit rotational speed signals, which are specific to the particular wheels, to the electronic central control unit 15 via corresponding lines 22/1 to 22/4. Power to the electronic control unit 15 is supplied from an electrical energy reservoir 16.

Depending on the configuration of the valves 18/1, 18/2 and 18/3, 18/4, pressure sensors 30/1 to 30/4 at the brake cylinder end or pressure sensors 31/1 and 31/2 (shown in dotted lines) associated with the axles can be provided and these transmit pressure signals to the control unit 15 via reception lines 32/1 to 32/4 or 32/2 and 32/4.

Furthermore, a wear sensor is respectively associated with at least one brake lining of a wheel of each axle, for example the wear sensor 24 with the brake lining 23/1 of the right-hand wheel of the front axle VA and the wear sensor 25 with the brake lining 23/3 of the right-hand wheel of the rear axle HA. The wear sensors 24, 25 can determine the respective residual lining thickness in fundamentally any known manner. The outputs of the wear sensors 24, 25 likewise operate via signal lines 24/1 and 25/1 connected with the electronic central control unit 15.

The respective wheel brake cylinders 20/1 to 20/4 represent actuators which displace the schematically illustrated brake linings 23/1 to 23/4 to produce deceleration effects on the wheels due to the action of friction on the respective wheel brake drum or disc.

Figure 2:
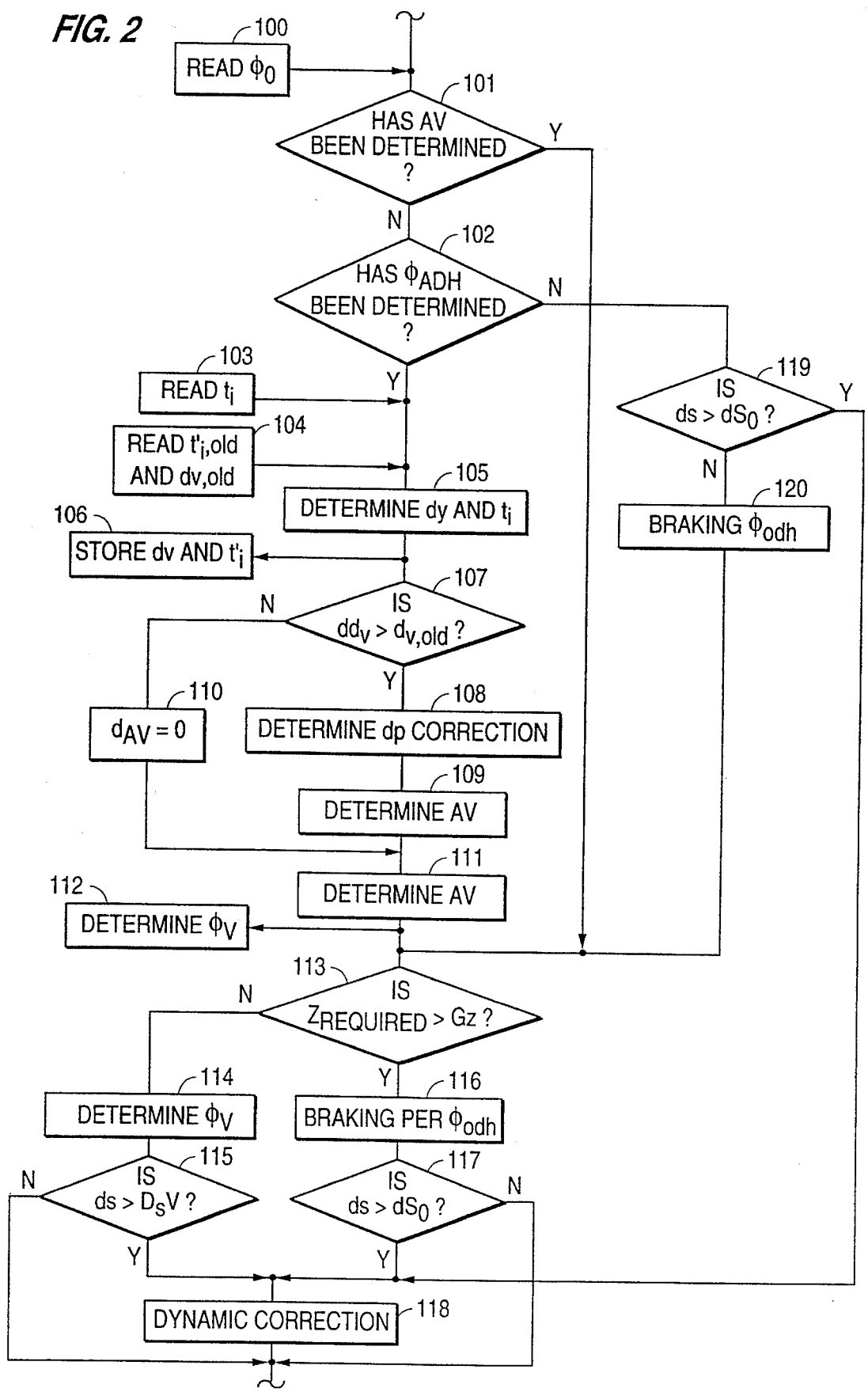
FIG. 2 is a flow diagram of the method of the present invention as applied to balanced wear between axles.

In the flow diagram of FIG. 2, an embodiment of a method of the present invention operates with long-term storage of the optimum-wear brake pressure distribution $\Phi_v$, which represents the brake pressure relationship between the front axle brake pressure and the rear axle brake pressure (pVA/pHA), and the state of wear.

$\Phi_{old}$ is the value which applies for a representative deceleration level, for example 0.25 * g, after the previous journey or is an initial average representative of the group of vehicles and corresponding to the distribution between axles or between wheels of the lining volume subject to wear. $\Phi_0$ or $\Phi_{old}$ is stored in a long-term memory of a brake computer 15/1 of the central control unit 15, $\Phi_0$ being overwritten by $\Phi_{old}$ during the operating period of the vehicle and $\Phi_{old}$ being continually brought up to date. The data from the long-term memory is read during the method steps 100 and 104, the values being brought up to date in the method steps 106 and 112.

After the value $\Phi_{old}$ has been read, step 101 inquires whether the parameter AV for the optimum-wear braking force distribution has already been determined for the current journey. If the parameter AV has already been determined, a jump takes place to the step 113 so that both the parameter determination of the optimum-adhesion braking force distribution between the axles and the determination of an optimum-wear braking force distribution parameter, $\Phi_v$, is bypassed. The required deceleration, $Z_{required}$, derived from the brake pedal position is compared with the limiting value, $G_z$, in step 113. The limiting value has been fixed at $G_z$=0.3 g. This limiting value is only exceeded in the case of full or emergency braking procedures which are not relevant to wear because they are not routine braking procedures.

If the limiting value, $G_z$, has been exceeded, the braking force distribution takes place in the step 116 only in accordance with the optimum-adhesion braking force distribution, $\Phi_{adh}$. The step 116 can be followed in the step 117 by a test to show whether the relative rotational speed difference, dS, between the vehicle wheels exceeds a limiting value, $dS_0$. If dS exceeds $dS_0$, a known dynamic correction of the braking action can take place in the step 118 as described in DE 40 07 360 A1. A control method cycle is complete after the dynamic correction, if necessary, or after the step 117. Other control methods associated with the braking action can follow or, alternatively, the next cycle of the control method is started.

If the limiting value, $G_z$, is not exceeded in step 113, the braking action is carried out in accordance with the wear-dependent braking force distribution $\Phi_v$, as calculated in 114 from the equation $$\Phi_v = AV + B * Z_{required}$$

For this equation, AV has been determined in step 111 or is equal to $AV_{old}$, and B is a quantity which is found during the determination of the optimum-adhesion braking force distribution in accordance with the known method of DE 40 07 360 A1. Step 115 checks whether the relative rotational speed difference, dS, between the wheels exceeds a further specified threshold value, $D_{sv}$. This threshold value can, for example, be a certain value in the range between 1% and 5%. If the limiting value is exceeded, a dynamic braking force correction takes place in step 118, as has been previously described. Otherwise, the method cycle is concluded.

If step 101 finds that the parameter, AV, has not yet been determined, step 102 questions whether the optimum-adhesion braking force distribution, $\Phi_{adh}$, has been determined or not. If $\Phi_{adh}$ has not yet been determined, a jump takes place to step 119 to check whether the rotational speed difference, dS, between the vehicle wheels exceeds a limiting value, $dS_0$. If the limiting value, $dS_0$, has been exceeded, a jump takes place to step 118 in which a known dynamic correction of the braking action is carried out.

If the limiting value, $dS_0$, has not been exceeded, step 120 determines an optimum-adhesion braking force distribution $\Phi_{adh}$, in accordance, for example, with the method described in DE 40 07 360 A1. A jump then takes place to step 113.

If it is found in step 102 that the optimum-adhesion braking force distribution, $\Phi_{adh}$, has already been determined for the current journey, the wear-dependent braking force distribution to be superimposed on this braking force distribution can be determined.

The brake lining thicknesses, $t_i$, of the n wheel brakes fitted with sensors are measured each time the vehicle starts because, normally, it can then be assumed that the wheel brakes and brake lining wear sensors are cold or, at least, not very hot. Measurement errors due to temperature effects are thereby largely alleviated. Because environmental effects such as humidity can have a negative effect on the measurement result, particularly when the vehicle is starting, a control measurement after two or three braking actions can, depending on the sensor operation and constructional principles, be advantageous. The originally measured values can, for example, be corrected by forming a weighted average of the values from the control measurement. The n values of the brake lining thicknesses, $t_i$, are stored in a memory. These values are called up from the memory in step 103. Average values, $t'_{i,old}$, of the brake lining thicknesses determined from a certain number of, for example, 10 to 20 preceding brake lining thickness measurements, together with wear differences, $d_{v,old}$, are likewise stored in the memory and are called up in step 104. On the basis of the values from steps 103 and 104, the wear difference, $d_v$, and the new average values, $t'_i$, are determined in step 105 and are then stored in step 106. It is also possible to store the current measured values instead of storing the average values, $t'_{i,old}$, and to form averages from the stored values and the new values. In the formation of the average, it is assumed that no appreciable wear has taken place over the storage period and that, therefore, the averaging substantially smooths the scatter in the individual measurements so that the actual brake lining thicknesses are determined with sufficient accuracy. In the case of brake lining wear control between axles, the difference between the brake lining thicknesses, $t_i$, at the front axle and the brake lining thicknesses, $t_i$, at the rear axle can be used, for example, as the wear difference, $d_v$.

Step 107 then determines whether a change, $dd_v$, of a certain minimum magnitude has appeared relative to the wear condition stored during a previous journey characterized, for example, by the wear difference, $d_{v,old}$. The minimum magnitude should be set so as not to be appreciably affected by measurement inaccuracies but is nevertheless as small as possible. If the wear difference, $d_v$, is used as the comparison parameter, the limiting value for the change, $dd_v$, can, for example, be fixed at $G_v$=1 mm. If the limiting value is exceeded, a new wear-dependent brake pressure distribution, $\Phi_v$, is determined in steps 108 and 109. The newly calculated wear-dependent brake pressure distribution, $\Phi_v$, should then only deviate slightly from the previous wear-dependent brake pressure distribution, $\Phi_{v,old}$. A correction value for the brake pressure difference, $d_p$, is determined as a function of the wear difference, $d_v$, in step 108. Consequently, a change in the previous pressure difference, $d_p$, of, for example, 0.2 bar is provided for the smallest, still reliably identifiable wear difference, $d_v$, in the case of a comparative deceleration of, for example, 0.25 g. Further values for the desired pressure difference, $d_p$, can be read, for example, from a characteristic diagram as a function of the parameter wear difference, $d_v$.

On the basis of the optimized adhesion in accordance with DE 40 07 360 A1, the value of the parameter, AV, in the braking force distribution function $\Phi_v = AV = +B*Z_{required}$ is determined in step 109, corrected by a corresponding amount, $d_{AV}$, on the basis of the determined desired pressure difference, $d_p$, from the equation $$d_{AV} = \frac{P_{VA} - 0.5*d_P}{P_{HA} + 0.5*d_P} - \phi_{old}$$

The brake pressures at the front axle, $P_{VA}$, and those at the rear axle, $P_{HA}$, are calculated for the comparative deceleration of 0.25 g on the basis of the braking force distribution $\Phi_{old}$, and step 111 then follows.

If, on the other hand, step 107 finds that the limiting value has not been exceeded, a jump takes place to step 110 in which the value of the change, $d_{AV}$, of the axle load distribution is set to zero, which means that the wear-dependent braking force distribution, $\Phi_v$, remains unaltered, and step 111 follows.

A calculation value $AV_{old}$ is calculated from the equation $$AV_{old} = \Phi_{old} - 0.25*g*B$$

in step 111 with the value B optimized for the current journey. The value obtained is corrected by way of the calculated, $d_{AV}$, so that $$AV = AV_{old} + d_{AV}.$$

From this, step 112 determines the wear-dependent brake pressure distribution, $\Phi_v$, from the equation $$\Phi_v = Av + 0.25*g*B$$

and stores that value in the long-term memory of the computer unit 15. Step 113 then follows.

If, during further operation of the vehicle, it is found that a previous change in the pressure difference was too small, i.e. that there is a further increase in the wear difference, the pressure difference is increased by a further 0.2 bar, for example, on recognition of the next stage of the wear difference. Because the adhesion is being monitored, there is no danger in increasing the pressure deviation, $d_p$, in proportion to a further increase in the wear difference, $d_v$. In the case of vehicles which have a diagnosis system, it is additionally possible to store, from the third pressure difference change relative to the optimum-adhesion brake pressure distribution, $\Phi_{adh}$, onwards, an indication that one or more of the wheel brakes is potentially not operating correctly.

Because of the long-term storage capability, the wear variation can be recorded over a fairly long period. In a further embodiment of the present invention, an extrapolation is derived from the result of previous changes of, $\Phi_v$, so that, assuming wear conditions which remain constant on the average, the remaining residual lining thickness which is, of course, currently known on each occasion will be simultaneously completely worn out.

Alternatively, a control system without a long-term memory can also be used. The current wear condition, $t_i$, is then measured each time the vehicle is started and the wear differences, $d_{v,i}$, is formed between the individual wheel brakes. The wear differences, $d_{v,i}$, are converted by a permanently stored constant to a correction for the basic brake pressure distribution, $\Phi_{vo}$, which is an average typical of the group of vehicles and corresponds to the distribution of the brake lining volume subject to wear. The constant is permanently stored in the program and is selected, on the basis of experience values, such that in the case of normal wear deviations, no unnecessarily large brake pressure changes take place. The other control steps, in particular the monitoring of the rotational speed differences, are utilized in the manner described above.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method of determining a wear-dependent braking force distribution between braked wheels of a vehicle, comprising the steps of determining wear values of brake linings at a beginning of each journey, supplying signals representing the wear values to a computer, determining the wear-dependent braking force distribution in the computer device at the beginning of each journey such that a setting signal representing a lower braking force is supplied to vehicle brakes exhibiting a wear which is too large relative to other vehicle brakes and retaining the wear-dependent braking force distribution during each journey, storing previously measured individual wear values in a memory of the computer, and controlling braking operations during each journey to obtain the wear-dependent braking force distribution.

2. The method according to claim 1, wherein the determined wear-dependent braking force distribution is stored in the memory.

3. The method according to claim 2, wherein at least one quantity representing a wear change is calculated from determined wear values and from the individual wear values stored in the memory, and a change in the wear-dependent braking force distribution relative to a stored braking force distribution only takes place when the quantity representing the wear change exceeds a limiting value.

4. The method according to claim 3, wherein, in the case of a change in the wear-dependent braking force distribution relative to the stored braking force distribution, a correction value is determined as a function of the quantity representing the wear change.

5. The method according to claim 3, wherein, in the case of at least two changes in the wear-dependent braking force distribution in a same direction within a limited time or within a driving performance limit, a signal representing one of premature brake wear and a faulty brake function is generated.

6. The method according to claim 1, wherein the memory is a long-term memory independent of vehicle operation.

7. The method according to claim 1, wherein the wear-dependent braking force distribution takes place jointly for the brakes of wheels of one axle.

8. The method according to claim 7, wherein the wear-dependent braking force distribution takes place between the axles such that a ratio of the wear values at the respective axles can be converted by at least one of increasing and reducing to a ratio of natural numbers, of which at least one is "one".

9. The method according to claim 1, wherein the determined individual wear values are stored in a shift register, and an average wear is calculated from the individual wear values.

10. The method according to claim 1, wherein the wear-dependent braking force distribution is superimposed on an optimum-adhesion braking force distribution.

11. The method according to claim 10, wherein the wear-dependent braking force distribution is suppressed when a required deceleration value derivable from an arbitrarily actuatable braking force pick-up, exceeds a limiting value.

12. The method according to claim 11, wherein the limiting value for the required deceleration value corresponds to a full or emergency braking action.

13. The method according to claim 12, wherein the limiting value is 0.3 times gravitational acceleration.

14. The method according to claim 10, wherein a limiting value is specified for the wear-dependent braking force distribution in the event of a relative wheel rotational speed difference between the wheels, the limiting value being between 1 and 5% of the average wheel rotational speed, and a dynamic correction of the braking force distribution takes place when the limiting value is exceeded.

15. The method according to claim 1, wherein an anti-lock braking system is superimposed on the wear-dependent braking force distribution.

16. The method according to claim 15, wherein the wear-dependent braking force distribution is superimposed on an optimum-adhesion braking force distribution.

17. The method according to claim 1, wherein the wear is determined only at the beginning of the journey.

* * * * *